Figure 1:
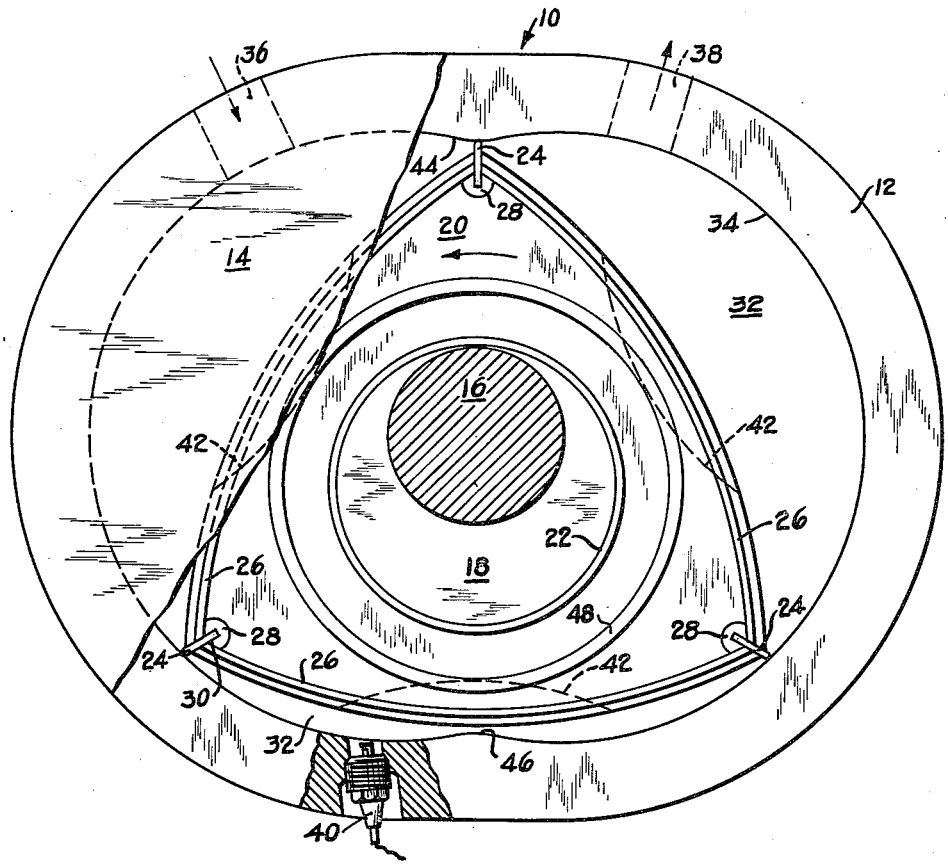

July 27, 1965     H. E. BACHMAN ETAL     3,197,125

SEALING SURFACES FOR ROTARY COMBUSTION ENGINES

Filed May 13, 1963

INVENTORS
HAROLD E. BACHMAN
ALBERT J. MACKALONIS
BY    JOHN E. JONES, JR.

ATTORNEY

United States Patent Office 3,197,125
Patented July 27, 1965

3,197,125
SEALING SURFACES FOR ROTARY
COMBUSTION ENGINES
Harold E. Bachman, New York, N.Y., and Albert J. Mackalonis, Belleville, and John E. Jones, Jr., Englewood, N.J., assignors to Curtiss-Wright Corporation, a corporation of Delaware
Filed May 13, 1963, Ser. No. 280,001
5 Claims. (Cl. 230—145)

This invention relates to rotary combustion engines and in particular to a novel means for improving the performance at the sealing surfaces of said engines. Although the invention will be described in relation to rotary combustion engines, it is equally applicable to other rotary mechanisms such as fluid motors and compressors. A rotary combustion engine as described herein may be of the type disclosed in United States Patent 2,988,065 issued to Felix Wankel et al.

In general, engines of this type comprise an outer body formed by a peripheral wall interconnected by a pair of parallel end walls thereby defining a cavity whose peripheral shape preferably is basically an epitrochoid. A rotatably mounted rotor is supported on a shaft within the cavity, the outer surface of which defines a plurality of circumferentially-spaced apex portions having radially movable seal strips mounted therein for sealing engagement with the inner surface of the peripheral wall thereby forming working chambers which upon relative rotation of the outer body and rotor vary in volume. An intake port is provided for admitting air or a fuel-air mixture to the combustion zone of said engine, an exhaust port is provided for expelling the burnt gases from said engine and an ignition means may be provided for igniting fuel-air mixture whereupon the stages of intake, compression, expansion and exhaust may be carried out. Of course, it should be understood that the ignition means is intended to include ignition as in the diesel cycle, as the invention contemplates use in a rotary combustion engine of the type described above which may be operated as a diesel engine.

It is generally known with regard to piston-type combustion engines that a lubrication means must be provided for reducing wear at the contacting surfaces of the piston seal means and the cylinder walls. This problem has had a relatively simple solution in reciprocating piston engines by continuously bathing the cylinder walls in oil while preventing the oil from entering into the combustion zone of the engine. In this manner sufficient lubrication is provided between the piston seal means and the cylinder walls to reduce wear at these contacting surfaces while the oil consumption is kept at a minimum since the oil is not exposed to the combustion zone. However, rotary combustion engines do not lend themselves to the simple solution applied to reciprocating piston engines since when oil is introduced to the contacting sealing surfaces, for example, between the apex seals and the inner surface of the peripheral wall, the oil becomes exposed to the combustion zone of the engine and will be consumed. Further, the effectiveness of the oil as a lubricating film is rapidly reduced by the high operating temperatures in rotary combustion engines to which the oil eventually becomes exposed. This requires that a continuous supply of fresh oil be introduced to the sealing surfaces in order to provide satisfactory lubrication. It has been found that due to the high temperatures and pressures at the mating sealing surfaces, in particularly the apex sealing surfaces, an oil film does not always satisfactorily prevent metal to metal contact which may result in a relatively rapid rate of wear at the metal contacting surfaces. This has been found to be a relatively serious problem during the break-in period.

The present invention has for its prime purpose the substantial elimination of the above-mentioned problems by providing a treated surface on the sealing surfaces of a rotary combustion engine which is characterized by providing low friction contact between said surfaces, in particular at high temperatures, and which permits the engine to operate with complete absence of oil at said contacting surfaces. The invention is generally carried out by treating the seals of the engine so as to form a low friction surface layer thereon, said layer minimizing the rate of seal wear particularly during the break-in period. The material of the treated surfaces used in the present invention is further characterized by the fact that the co-efficient of friction of the surfaces decreases with increasing temperature thereby aiding in reducing wear at high speed, high operating temperatures. Since no oil is required for lubrication of the sealing surfaces, oil consumption which proved to be a serious problem in prior rotary combustion engines, is kept at a minimum by use of the present invention.

Accordingly it is one object of the invention to provide a novel and improved seal construction for a rotary combustion engine.

It is another object of the invention to provide novel and improved seals for a rotary combustion engine wherein the seal surfaces are treated for providing a low friction protective layer which improves seal performance.

It is a further object of the invention to provide novel and improved sealing surfaces for a rotary combustion engine which surfaces are characterized by a decreasing co-efficient of friction with increasing temperature.

It is an additional object of the invention to provide a novel and improved sealing surface construction for the apex seals in a rotary combustion engine.

It is another object of the invention to provide a novel and improved sealing surface construction for the side face seals of the rotor in a rotary combustion engine.

Figure 2:
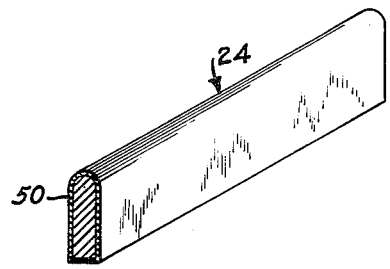

Other advantages and objects of the invention will become apparent upon reading the following detailed description with the accompanying drawings wherein:

FIG. 1 is a sectional view of a rotary combustion engine to which the invention may be applied; and FIG. 2 is an enlarged perspective view of one of the sealing elements with a portion thereof cut-away to illustrate the present invention.

Referring to FIG. 1, there is shown therein a sectional view of a rotary combustion engine generally designated at 10 in which the present invention may be embodied. The rotary combustion engine 10 comprises an outer body formed by a peripheral wall or rotor housing 12 interconnected with a pair of end housings designated at 14. As illustrated, the contour of the inner surface of the peripheral wall 12 has a multi-lobe profile which as shown in FIG. 1 is basically a two-lobed epitrochoid. A shaft 16 is rotatably supported within the outer body 12 by suitable bearings (not shown) with said shaft 16 having an eccentric portion 18 formed thereon. Rotatably supported on the eccentric portion 18 is a rotor 20 with a suitable bearing 22, such as a sleeve-type bearing, interposed therebetween for supporting said rotor on the eccentric portion 18. The rotor 20 has a plurality of circumferentially-spaced apex portions in each of which there is mounted a radially-movable apex seal strip 24 with the rotor shown in FIG. 1 having three lobes joining together to form three apex portions on said rotor. It is of course to be understood that the invention is not limited to a two-lobed cavity and a rotor having three apex portions and it is intended that other combinations may be used, for example, a three-lobed cavity with a rotor having four apex portions.

Seals 26 are provided within each of the side faces of the rotor for sealing engagement with the inner surfaces of the end housings, said seals 26 meeting with intermediate seal bodies 28, which also aid in supporting the apex seal strips 24 in each of the apex seal grooves 30, thereby forming a continuous seal for each of the working chambers 32 being defined between the apex portions of the rotor and the inner surface 34 of the peripheral wall. It will be apparent therefore that, as the rotor and outer body rotate relative to one another, the working chamber 32 being defined between the apex portions of the rotor and the inner surface of the peripheral wall, will vary in volume.

Suitable gearing between the shaft 16 and the rotor 20 may also be provided for guiding the rotor in tracing its epitrochoidal path and may take the form of that illustrated in said above-mentioned patent, said gearing not being illustrated in FIG. 1.

An intake port 36 is provided for admitting air or a fuel-air mixture to supply the combustion zone of the engine, and exhaust port 38 is provided for expelling the burnt gases from the engine and an ignition means 40, illustrated as a spark plug in FIG. 1, may be provided for igniting the fuel-air mixture whereby it can be seen that the stages of intake, compression, expansion and exhaust may be carried out. It should be understood, however, that the spark plug 40 may be eliminated if the engine is run on the diesel cycle. A portion of each of the working faces of the rotor may be cut out as indicated at 42 for permitting the gases to flow across the lobe portions 44 and 46 of the rotor 20. An oil seal 48 is also provided for preventing the oil used for lubricating the shaft bearings, etc. from leaking out into the working chambers 32, with said oil seal being in sealing contact between the rotor faces and the adjacent faces of the outer body end walls. The engine so far described is considered conventional and reference may be made to the above-mentioned patent to Felix Wankel et al. for a more complete description of the structure and operation of said engine.

Due to the sliding engagement between the apex seal strips 24 and the inner surface 34 of the peripheral wall 12 and between the side face seals 26 and the respective end faces of the end walls of the outer body, it is considered necessary to provide a lubricant between these contacting surfaces in order to reduce wear. This wear is produced by the friction between the rubbing metal surfaces and is a limiting factor of the overall life of the engine. One solution of this problem has been practiced in prior engines of this type, that being, depositing a film of oil on the inner surface 34 of the peripheral wall 12 either by mixing the oil with the fuel or by metering the oil through the peripheral wall 12 or the rotor 20. However, it has been found that due to the high engine operating temperatures the oil film rapidly looses its effectiveness as a lubricant and must be continuously replaced by fresh oil. Further, as will be apparent from FIG. 1, the oil will be eventually swept into the combustion zone where the oil will be consumed by combustion. This results in a relatively high consumption of oil which, as is well known, is a serious drawback in combustion engines.

As previously stated, it is the prime purpose of the invention to provide an efficient low friction lubricating means for the sealing surfaces of a rotary combustion engine without suffering the penalties of high oil consumption. The invention takes advantage of the unique properties of certain elements, such as sulphur, chlorine and phosphorus, to prevent scoring of metals and which elements readily react with the metal to form a protective layer. These elements react with iron to form protective layers of iron sulphide, iron chloride and iron phosphide or phosphate. Although each of the elements is applicable to the invention, the sulphide layers have been found to be preferable because they are very stable, are unaffected by the presence of moisture, and retain their anti-seizing properties up to very high temperatures and have the effect of a decrease in co-efficient of friction with increasing temperature.

The invention is carried out by treating the sealing surfaces, in particular the surfaces of the apex seals 24 with a sulphide compound such as hydrogen or ammonium-sulphide which compound reacts with the iron in the sealing surface to form iron sulphide. Although the invention is particularly applicable to the sealing surface of the apex seals 24, it should be understood that the invention is equally applicable to the side seals 26, the intermediate seal bodies 28 and the inner surface 24 of the peripheral wall 12. Also, the invention is applicable to all iron sealing surfaces or alloys thereof. For example, the materials used in the seals disclosed in United States Patent 3,033,180 issued to Max Bentele on May 8, 1962, may be used in the present invention. Such sealing surfaces shall be hereinafter referred to as being composed of iron but it is intended to include alloys thereof.

The treatment of the iron sealing surfaces, in particularly referring to the apex seals 24, is carried out by suspending the apex seal members 24 in a closed vessel partially filled with water with said seal members being suspended therein above the water level by a titanium wire which is relatively inert to the treatment process. A sulphide compound, such as hydrogen-sulphide, is injected into the water and the resultant sulphur vapors react with the iron in the outer surfaces of the seal member 24 to form an iron sulphide compound. This reaction can be carried out at room temperature and is easily controllable in that the reaction can be limited by time. After the seal is removed from the vessel, it can be polished to remove any rough or undesirable surface characteristics. In FIG. 2 there is shown an apex seal 24 which is diagrammatically illustrated as having an outer surface layer 50 formed of iron sulphide. It should be understood, however, that the outer surface 50 in FIG. 2 has been greatly exaggerated for purposes of illustration and that the boundary layer between the outer surface and the iron of the seal body is not normally as definite as indicated in said figure, which has been thus shown also for purposes of illustration. It has been found that a reaction covering a period of approximately 24 hours results in a sulphide layer ranging from 0.0001 to 0.0004 inch thick. It has also been found that some of the sulphide impregnates deeper into the metal of the seal member and may be present to a depth of 0.002 to 0.003 inch from the outer surface. However, as stated above, the thickness of the outer surface is readily controlled and can be varied according to the thickness desired for the particular usage. The range of thickness found to be preferable from the standpoint of practicing the invention is within 0.0001 to 0.0004 inch thick. With this range there is sufficient iron sulphide present to substantially fill in all of the irregularities in the metal surfaces and to provide a thin protective layer on said metal surfaces while not being too thick so that, when the surface wears off, too great a clearance will be present between the sealing surfaces.

It is known when using iron apex seals without the coating of the invention that, even when providing the smoothest metal surface available, many irregularities in the form of microscopic hills and valleys or crevices are present and that the actual contact area where the protruding irregularities meet is only a very small fraction of the apparent surface area. With increasing load this contact area increases, but still remains almost negligible compared to the apparent area. At the points of intimate contact of the asperities of the mating surfaces strong adhesion exists and a continuous solid is formed. When the surfaces slide relative to one another, the junctions so formed are sheared by a force whose major component occurs from the frictional resistance. This shearing of the junctions usually occurs not at the interface, but a little distance within the softer metal. The resulting transfer of metal from one surface to another represents a form of wear.

It has been found that through the application of the invention to the apex seals, the sulphide reacting with the iron flows in the crevices in the metal and increases the area of real contact between the apex seal 24 and the inner surface 34 of the peripheral wall. The sulphide interface between two opposing asperities will distribute the contact pressure and result in the bending over of the asperities instead of their wearing together. Thus, it will be seen that the wear of the sliding surfaces is substantially reduced which reduction in wear has been found to be superior to that provided by oil films formed by conventional oils deposited on the contacting surfaces. It has been found that conventional oils cannot maintain an oil film to prevent metal to metal contact at the high temperatures and pressures of the mating surfaces. The sulphide surfaces of the present invention however have the characteristic that the co-efficient of friction decreases with increasing temperature and pressure, thus reducing wear under these conditions which results in superior engine performance and longer running life.

It has been further found that due to the fact that the entire surface area of the seals are treated in accordance with the invention to form an iron sulphide surface the free movement of the seals within their seal grooves is substantially improved. This results in the substantial elimination of the problem of jamming of the seal strips within the seal grooves which in previous embodiments of seal strips is brought about by the digging in of the corners of the seal strips into the side walls of the grooves during tilting of the seals within said grooves. The present invention also serves to aid in eliminating the problem of seal chattering which may be characterized by grooves or chatter marks formed on the inner surface of the peripheral wall due to sudden radial movements of the seals within the seal grooves.

As explained above, the operating life of the seal strips and the inner surface of the peripheral wall is substantially extended through the use of the present invention. Obviously, however, the sulphide layer provided by the treatment of the present invention will not remain indefinitely on the sealing surfaces. It has been further found however, that there is a residual effect on the sealing surfaces due to the sulphide reaction, in that the iron sulphide compound which fills the valleys and crevices between opposing asperities on the surfaces causes these surfaces to become relatively extremely smooth. Therefore, the wear rate even after the outer sulphide layer is worn off is substantially reduced in comparison to previous seal strip constructions and thereby add to the operating life of the engine. It should be understood however that even though the sulphide layer will be eventually worn off, that said layer is relatively tough and the layer lasts for a relatively long time. It has also been found that the sulphide surface is particularly effective during the break-in period of the engine where due to the normal conditioning of the metal surfaces wear rate is normally highest. As explained above, the sulphide layer between the contacting metal surfaces serves to prevent metal to metal contact with resulting high rate of transfer of metal from one surface to another or in other words, a high rate of metal wear.

It will be apparent from the above description that the present invention provides an improved lubricating means between the contacting surfaces of the seal means in a rotary combustion engine. It should be particularly noted that the lubricating of the surfaces is brought about with complete absence of the usage of lubricating oils and thereby consequently reduces the oil consumption in said engines. Through the treatment of the sealing structure of the present invention the wear life of the sealing surfaces is substantially increased and has been found to provide better wearing characteristics than the use of chromium plating on said surfaces. Also, such problems as seal strip jamming and chattering are substantially eliminated. Further, the method of treating the sealing surfaces in the present invention is relatively simply carried out and easily controlled. It should be understood however, that the invention is not only applicable to the apex seal strips, but also may be applied to the side face seal elements and intermediate seal bodies of the rotor as well as the inner surfaces of the peripheral wall and end housings of the outer body.

While the invention has been set forth in detail in the above description, it should be understood that the invention is not to be limited by the specific details set forth therein and that various modifications and changes may be made by those skilled in the art without departing from the spirit and scope of the invention as defined in the following claims. For example, the invention is also applicable to fluid motors and compressors or other mechanisms wherein lubrication is desired while eliminating the penalties of oil consumption.

We claim as our invention:

1. In a seal means for use with a rotary combustion engine having relatively rotatable inner and outer bodies and having sliding sealing engagement with one of said bodies for sealing at least a portion of a combustion chamber of said engine, said seal means including a seal strip being composed of a base material comprising metal and having a surface coating comprising a sulphide compound of said base metal material.

2. A seal means for use with a rotary combustion engine as recited in claim 1 further comprising side face seal elements carried by said inner body for sliding engagement with said outer body with said side face seal elements being composed of a base material comprising a metal and having a surface coating comprising a sulphide compound of said base metal material.

3. A seal means for use with a rotary combustion engine as recited in claim 1 wherein said base metal material comprises iron as at least one of its constituents.

4. A seal means for use with a rotary combustion engine as recited in claim 3 wherein said surface coating comprises iron sulphide.

5. A seal means for use in a rotary combustion engine as recited in claim 4 wherein said iron sulphide outer layer has a thickness within the range of 0.0001 to 0.0004 inch thick.

References Cited by the Examiner

UNITED STATES PATENTS

| | | | |
|---|---|---|---|
| 2,616,615 | 11/52 | Scott | 230—152 |
| 2,644,804 | 7/53 | Rubin | 277—237 X |
| 2,905,376 | 9/59 | Davey | 230—152 |
| 3,033,180 | 5/62 | Bentele | 123—8 |

KARL J. ALBRECHT, *Primary Examiner.*

JOSEPH H. BRANSON, JR., *Examiner.*